Nov. 16, 1954  N. SAINDERICHIN  2,694,565
ROTARY FURNACE
Filed March 13, 1951  2 Sheets-Sheet 1
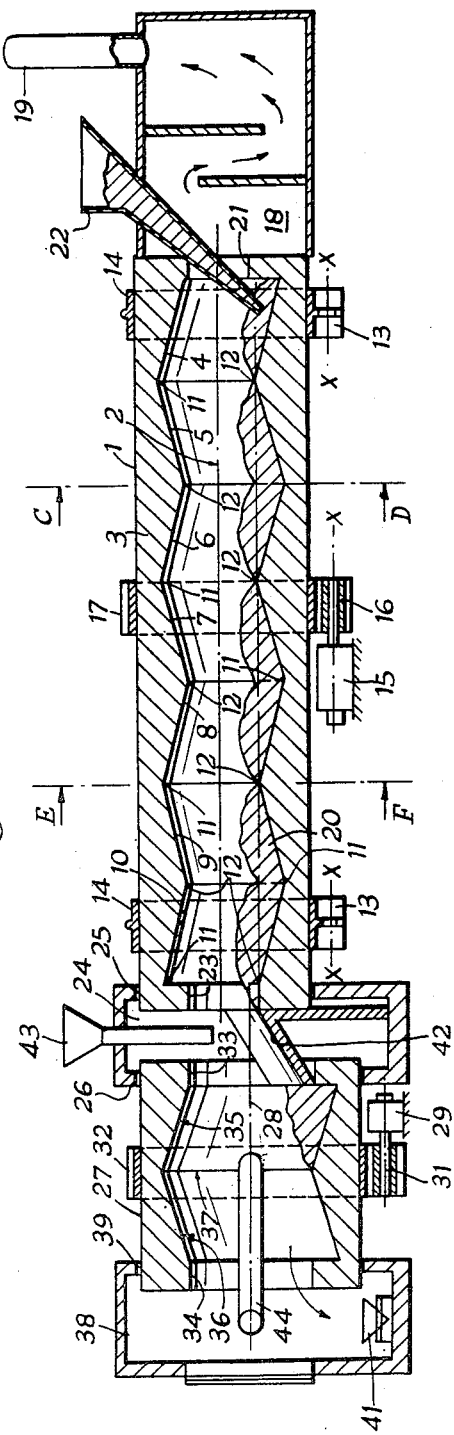
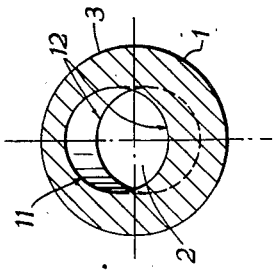
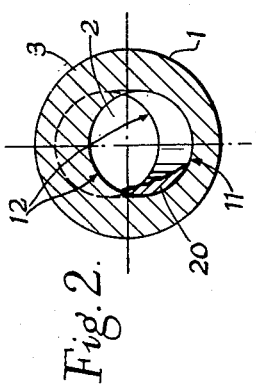
INVENTOR:
NICOLAS SAINDERICHIN.
BY:
Chatwin & Company.
ATTORNEYS.

Nov. 16, 1954   N. SAINDERICHIN   2,694,565
ROTARY FURNACE
Filed March 13, 1951   2 Sheets-Sheet 2

INVENTOR:
NICOLAS SAINDERICHIN.
BY:
ATTORNEYS.

United States Patent Office 2,694,565
Patented Nov. 16, 1954

2,694,565

ROTARY FURNACE

Nicolas Sainderichin, Paris, France

Application March 13, 1951, Serial No. 215,347

Claims priority, application France March 28, 1950

2 Claims. (Cl. 263—32)

The employment of the cylindrical furnace in cement works is almost exclusive and is becoming more and more generalised in metallurgy and chemical industry.

It is the most appropriate apparatus for the treatment of pulverulent materials, whether dry or wet, in spite of the inconveniences inherent to the rotary furnaces at present in use.

These inconveniences are, in particular, the following:

These furnaces are necessarily of very long length, up to 120 metres, this length being necessary in order to use, in rational manner, the combustion gases passing through the furnace. It is in effect necessary to allow time for these gases to exchange their calories with the material which passes within the furnace.

This length of the furnace brings the following consequences:

Increased heat losses due to radiation,

An increased weight for the furnace,

The necessity for an increased driving power to turn the furnace,

Difficulties for the propagation of the flame and the calorific repartition of the combustion gases, Deposits on the walls, The impossibility of disposing the furnace horizontally which brings about the impossibility of maintaining the composition and the homogeneity of the mixture of materials of different characteristics composing the charge, resulting in irregularity in the composition of the product manufactured, The length of the furnace causes sagging under the effect of its own excessive weight and that of the charge under treatment.

There is as a result great wear on the furnace resulting in the necessity for multiple bearings which are difficult to align and difficult to maintain, and which are consumers of power and onerous in installation and maintenance. The inclination of the furnace towards the discharge end brings about heavy work for the end-thrust bearings due to the pressure. As a result there is an exaggerated consumption of driving power and a tendency to rupture of the joints of the furnace.

Various solutions have been proposed to slow down the travel of the material in a rotary furnace which permits contraction, viz. mechanical means leading the material partially to the rear or annular projections slowing down the flow of the material.

The first means are complicated and are little resistant to hot gases.

The second means create zones of accumulation of the material and hindrances to the circulation of the gases. The inconveniences exceed the advantages and it is the inclined furnace, of necessarily long length, which is still employed despite its inconveniences, a part of which have been enumerated above.

The object of the present invention is to provide a rotary furnace apparatus in which the passage of the material is slowed down and its mixing assured at the same time by the disposition of the internal surface itself of the rotary furnace, which permits with the employment of a horizontal furnace, considerably shortened, to avoid the aforementioned inconveniences without introducing therein others compensating therefor or exceeding them.

According to the present invention the rotary furnace apparatus comprises a pre-heating chamber arranged to rotate about a horizontal axis and having a sectioned bore the longitudinal axes of symmetry of the sections of which bore are inclined, in a plane containing the axis of rotation of the chamber, to one side and the other of the said axis of rotation, whereby rotation of the chamber serves to feed material from one end thereof to the other, a stationary chamber into one side of which the outlet end of the rotary chamber engages, a rotary firing chamber engaged by its inlet end in the opposite side of the stationary chamber, a chute in the stationary chamber leading from the outlet end of the pre-heating chamber to the inlet end of the firing chamber, and burner means in the firing chamber adapted to direct hot gases from the firing chamber through the stationary chamber and through the pre-heating chamber.

There may be provided a hopper extending into the inlet end of the pre-heating chamber and serving to feed material thereto, an evacuation chamber for gasses arranged at the inlet end of the evacuation chamber for the reception of hot gases therefrom, and a chimney on the evacuation chamber to dispose of the gases.

The firing chamber may be similarly sectioned for feeding material from its inlet end to its outlet end, with a chute in the stationary chamber leading from the outlet end of the pre-heating chamber to the inlet end of the firing chamber, and means in the stationary chamber for feeding reduction carbon onto said chute. Burner means are arranged in the firing chamber and adapted to direct hot gases from the firing chamber through the stationary chamber and pre-heating chamber.

Motor means are connected to the pre-heating chamber and to the firing chamber for the rotation thereof.

A further stationary chamber may be arranged at and receive the outlet end of the firing chamber, and conveyor means may be provided in said further stationary chamber to convey therefrom material emerging from the outlet end of the firing chamber.

The segments are advantageously cylindrical with the axes of the segments passing through the axis of rotation and the segments themselves joining one to the next along circles displaced alternately to one side and the other of the axis of rotation.

The section of this internal surface through the diametral vertical plane of symmetry is thus composed of two opposed saw-tooth shapes, each summit of the one being opposed to a hollow of the other.

As a result of this disposition, at each half turn the quantity of material collected in a hallow is divided by the relief formed opposite thereto by the joining of two successive segments. One half of the material progresses towards the exit of the furnace and one half is retrograde towards the entrance, each half mixing with a portion of material displaced in inverse direction in neighbouring cylinders. As a result there is a progressive slowing of the material supplied to one extremity and an intimate stirring of the material. The reduction of the length of the furnace can be as much as or even more than ⅔ of the length of the usual cylindrical furnace.

The end-thrust effects are avoided since the furnace is in rotation about a horizontal axis.

The speed of progression, for a given number of turns, depends, for equal length, upon the number of segments of the rotary furnace.

One could adapt the slope of several cylinders and their diameters within a view to realising the best conditions for mixing of the charge and circulation of the gases to favour heat exchanges.

The accompanying figures permit a better understanding of the invention.

They show schematically an example of construction of a furnace, according to the invention and a series of schematic diagrams showing the passage of the charges.

In these figures:

Figure 1 is a schematic longitudinal section of a furnace according to the invention with a rotary part where the material is pre-heated and, comprising for example seven sections and a rotary firing chamber comprising two sections in which the charge is melted.

Figures 2 and 3 are two transversal sections taken on the lines CD and EF of Fig. 1.

Figure 4:
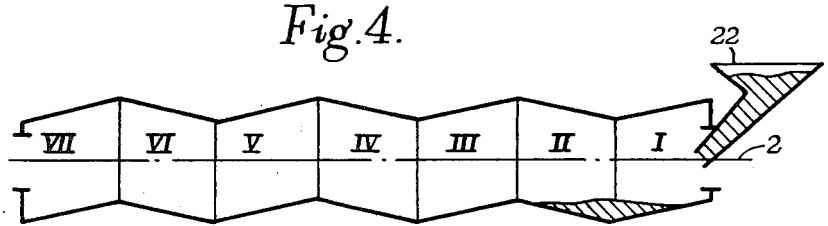
Figures 4, 5, 6, 7, 8, 9 and 10 are schematic elevational sections of the pre-heater, staggered one from another by a half turn, showing the passage of the first charges at the commencement of operation of the furnace.
Figure 5:
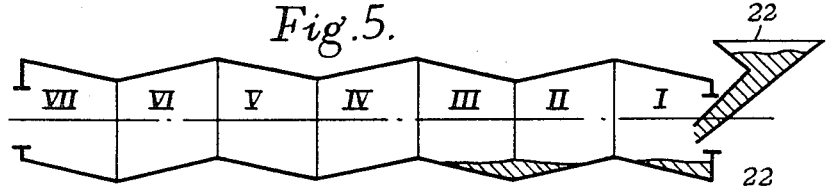
Figure 6:
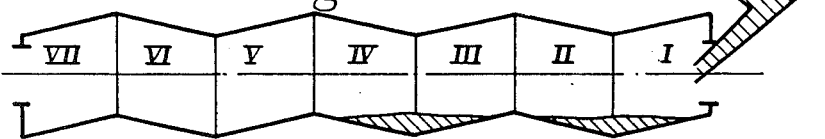
Figure 7:
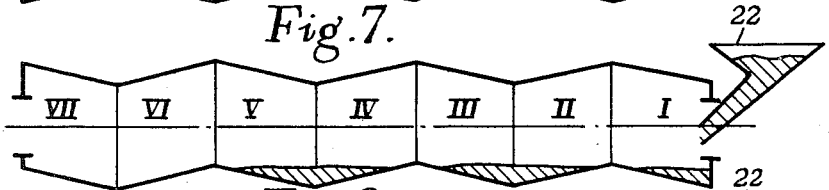
Figure 8:
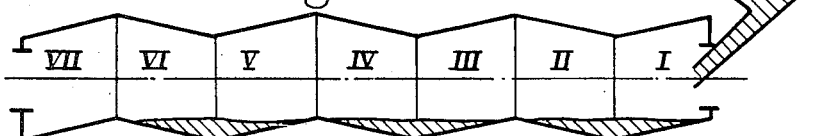
Figure 9:
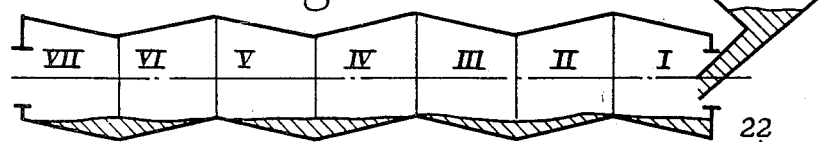

In Figure 1, 1 is the part of the rotary furnace serving for pre-heating of the material. According to the invention, in the furnace, which is externally cylindrical and revolves about a horizontal axis 2 and the walls of which are lined with for example refractory material 3, there is formed an internal passage composed, in the case illustrated, of seven cylindrical segments, 4, 5, 6, 7, 8, 9 and 10 joined along circles, which are alternately eccentric to the axis 2 in opposite directions, and forming a circular hollow 11 on one half of each circumference and a relief 12 on the other half.

This pre-heating cylinder 1 is provided with bearings 13 and rolling rims 14.

It is rotated by means of a speed-reduced motor 15 driving, by means of a pinion 16, a toothed annulus 17 encircling the body 1.

At its extremity remote from the firing chamber, the body 1 opens through an orifice 21 into an evacuation chamber 18 for gases leading to the chimney 19.

Through the orifice 21 the material or the mixture to be treated is led into the furnace by means of a charging hopper 22. At its other extremity, the body 1 opens through an orifice 23 into an intermediate fixed chamber 24.

The body 1 enters the chamber 24 through a passage 25 which is provided with convenient known means, not shown, for sealing against exit of hot gases or entry of air between the rotary cylinder and the fixed wall.

In the opposite wall of the chamber 24 an analogous circular orifice 26 receives another horizontal rotary furnace 27 turning about a horizontal axis 28 and driven by a reduction-geared motor 29 driving, through a pinion 31, a toothed annulus 32 carried by the furnace 27. The furnace 27 serving as a high temperature firing chamber is open at its two extremities by circular orifices, respectively 33 and 34, having their centres on the axis 28. This furnace 27 is short and only comprises, for example, two inclined cylindrical bores 35 and 36. These cylindrical bores meet along a circumference 37 eccentric to the axis 28, and are tangents at their opposite extremities, at points comprised in the diametral plane containing the axes of the cylinders, to the orifices 28 and 34. The furnace 27 enters through an orifice 39 into a chamber 28.

In the chamber 38, means 41 for the evacuation of the material 20 treated permit its removal as it emerges from the furnace 27 through the orifice 34.

In the chamber 24, a fixed cylindrical part 42 conducts, by gravity, the material 20 from the cylinder 1 into the cylinder 35. This part 42 is sufficiently inclined so that the cylinders 35 and 36 can be of greater diameter than the cylinder 10, and so that the axis 28 can be disposed lower than the axis 2. Reducing carbon can be fed in through a chute 43 onto the inclined part 42 to mix with the material 20 in the furnace 27 and there reduce the mixture pre-heated in 1, in the case of the production of a metal by reduction.

The furnace 27 is heated to a high temperature by a burner schematically shown at 44 which is fed in a known manner with heated gas and air for example.

The hot gases in combustion escape through the orifices 33 and 23, cross the chamber 24 and the turning part 1 whilst heating the material 20 which passes therethrough by the effect of the alternate cylindrical surfaces in rotation.

In the furnace 27 the materials are mixed by the rotation and are alternately displaced by the alternate cylindrical surfaces 33 and 36 in order to emerge through the orifice 34 and be removed, after final treatment, through the evacuation means 41.

Figure 10:
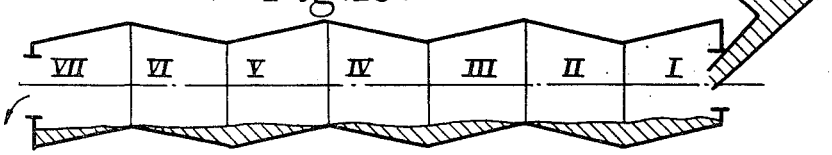

The schematic Figures 4 and 10 show the passage and the mixture of the material 20 after the start of charging continued to the commencement of the exit of the material at the end of three turns and a half of the pre-heated cylinder comprising the inclined cylindrical sections I, II, III, . . . VII.

The letters A, B, C, D, E, F, G, indicate qualitatively the portion of material introduced into the cylinder 4 during each half turn and the presence of parts proceeding therein at each point of the passage. It can be seen, on simple inspection of these schematic drawings, that at the end of three and a half turns, in the case of seven cylindrical segments, the material emerging from the furnace has a proportion of mixture corresponding to the quantities introduced during five half turns, but furthermore, the material introduced at the third half turn for example is again in part in the sections V and VI of the furnace. There is thus considerable slowing down and very efficacious mixing which, thanks to the alternation in direction of the passage, prevents the separation of the most dense bodies, for example, which have a tendency to precede the others.

In practice, the efficacy of the apparatus permits reductions of the length of the rotary furnace to a third of the length necessary for the same purpose of an ordinary rotary inclined furnace. The rotary furnace could comprise a single rotary part or several in series as in the example shown, at least one of these rotary parts being of the type with alternately inclined internal cylindrical segments.

The number and inclination, the length and diameter of these cylinders are any that are appropriate to the work for which the furnace is constructed.

The circles of joining of the bases of the inclined cylindrical segments can be replaced by any appropriate closed contour such as elliptical or even polygonal without exceeding the invention, the cylinders being then replaced by oblique prisms.

In place of the cylindrical or prismatic segments, there could be combined segments of surfaces of revolution with unequal bases, for example successive truncated cones forming saw-toothed profiles different from those shown.

The height of the different segments could be different.

All these combinations of shapes, forming by their alternation shapes facing in the same diametral plane, sometimes concave, sometimes convex, by angular connection or by progressive continuous connection, and producing by this fact by rotation of the furnace about a horizontal axis an advance with alternate returns of the material which produces therein a slowed passage and a more complete mixing with respect to the inclined cylindrical furnaces, come within the spirit of the invention of which they are only variations.

Naturally, it is the shape of the interior surface which counts. It can in certain cases be formed by a simple metallic envelope without refractory lining and the external shape of the furnace can be other than cylindrical, this furnace rotating about a horizontal axis.

The application of the apparatus of the invention can be made to all sorts of rotary furnace, no matter what the application is, conversion to the purpose followed in each case taking place by alteration of the heating, the speeds of rotation, the dimensions of the furnaces, the number of cylindrical segments, and the use or the non-use of the firing chamber.

The invention can be applied to rotary furnaces for drying, calcination, roasting of pyrites or the like, the distillation of volatile materials, the agglomeration of mineral or metallic fines, the preparation of metallic sponges, the manufacture of cement etc.

I claim:

1. A rotary furnace apparatus comprising a horizontal pre-heating chamber arranged to rotate about a horizontal axis and having a sectioned bore the longitudinal axes of symmetry of the sections of which bore are alternately inclined, in a plane containing the axis of rotation of the chamber, to one side and the other of said axis of rotation, feeding of material from one end of the chamber to the other being obtained solely by rotation of the chamber by virtue of the arrangement of the sectioned bore thereof, a stationary chamber into one side of which the outlet end of the pre-heating chamber engages, a horizontal rotary firing chamber engaged by its inlet end in the opposite side of the stationary chamber, the bore of said firing chamber being similarly sectioned whereby feeding of material therethrough is obtained solely by rotation of the firing chamber by virtue of the arrangement of the sectioned bore thereof, a chute in the stationary chamber leading from the outlet end of the pre-heating chamber to the inlet end of the firing chamber, means in the stationary chamber for feeding reduction carbon onto said chute, and burner means in the firing chamber adapted to direct hot gases from the firing chamber through the stationary chamber and pre-heating chamber.

2. A rotary furnace apparatus comprising a horizontal pre-heating chamber arranged to rotate about a horizontal axis and having a sectioned bore the longitudinal axes of symmetry of the sections of which bore are alternately inclined, in a plane containing the axis of rotation of the pre-heating chamber, to one side and the other of the said axis of rotation, feeding of material from one end of the pre-heating chamber to the other being obtained solely by rotation thereof by virtue of the arrangement of the sectioned bore thereof, motor means connected to said pre-heating chamber for rotation thereof, a stationary chamber into one side of which the outlet end of the pre-heating chamber engages, a horizontal rotary firing chamber arranged to rotate about a horizontal axis, said firing chamber having a sectioned bore the longitudinal axes of symmetry of the sections of which bore are alternately inclined, in a plane containing the axis of rotation of the firing chamber, to one side and the other of the axis of rotation of the firing chamber, feeding of material from one end to the other of said firing chamber being obtained solely by rotation thereof by virtue of the arrangement of the sectioned bore thereof, other motor means connected to the firing chamber for rotation thereof, a chute in the stationary chamber leading from the outlet end of the pre-heating chamber to the inlet end of the firing chamber, means in the stationary chamber for feeding reduction carbon onto said chute, burner means in the firing chamber adapted to direct hot gases from the firing chamber through the stationary chamber and pre-heating chamber, a further stationary chamber arranged at and receiving therein the outlet end of the firing chamber, and conveyor means in said further stationary chamber to convey therefrom material emerging from the outlet end of the firing chamber.

References Cited in the file of this patent
FOREIGN PATENTS

| Number | Country | Date |
|---|---|---|
| 13,440 | Great Britain | Dec. 17, 1908 |
| 284,494 | Great Britain | Feb. 2, 1928 |
| 531,065 | Germany | Aug. 5, 1931 |
| 782,674 | France | June 8, 1935 |